US012768554B2

(12) United States Patent
Ally et al.

(10) Patent No.: US 12,768,554 B2
(45) Date of Patent: Oct. 20, 2026

(54) SENSOR AUGMENTATION FOR EARLY DETECTION OF A3 FLAMMABLE REFRIGERANT LEAKS WITH SELF-CHECK AND DIAGNOSTICS

(71) Applicant: UT-Battelle, LLC, Oak Ridge, TN (US)

(72) Inventors: Moonis R. Ally, Oak Ridge, TN (US); Stephen M. Killough, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 351 days.

(21) Appl. No.: 18/593,098

(22) Filed: Mar. 1, 2024

(65) Prior Publication Data

US 2025/0102170 A1 Mar. 27, 2025

Related U.S. Application Data

(60) Provisional application No. 63/540,694, filed on Sep. 27, 2023.

(51) Int. Cl.

*F24F 11/00* (2018.01)
*F24F 11/36* (2018.01)

(Continued)

(52) U.S. Cl.

CPC .............. *F24F 11/36* (2018.01); *G01N 27/12* (2013.01); *F24F 2110/65* (2018.01)

(58) Field of Classification Search

CPC ...... G01N 27/02; G01N 27/04; G01N 27/626; G01N 30/68

See application file for complete search history.

(56) References Cited

U.S. PATENT DOCUMENTS

2004/0080424 A1* 4/2004 Perry ..................... G08B 21/16 340/632
2008/0319682 A1* 12/2008 Holland ............... G01N 1/2273 702/24

(Continued)

OTHER PUBLICATIONS

Helwig et al, Self-Test Procedures for Gas Sensors Embedded in Microreactor System, Feb. 3, 2018, Sensors (Basel), vol. 18, issue 2. (Year: 2018), pp. 1-16.*

(Continued)

*Primary Examiner* — Mark A Connolly
(74) *Attorney, Agent, or Firm* — Fox Rothschild LLP; Carol E. Thorstad-Forsyth

(57) ABSTRACT

Systems and method for operating a sensor system located in, on or proximate to equipment. The sensor system is configured to: generate heat to ionize nearby flammable gasses such that the ionization products can be absorbed by a conductive sensing material which causes a change in resistance on the conductive sensing material; measuring the resistance on the sensor system to obtain an indication of a presence or absence of a flammable gas in a surrounding environment; assign a severity level to an operational state of the equipment based on the resistance measurement; select an action from a plurality of different actions based on the severity level which was assigned to the operational state of the equipment; and control operations of a robotic actuator or electronic device to perform the action.

19 Claims, 10 Drawing Sheets

(51) Int. Cl.

| | |
|---|---|
| ***G01N 27/02*** | (2006.01) |
| ***G01N 27/04*** | (2006.01) |
| ***G01N 27/12*** | (2006.01) |
| ***G01N 27/62*** | (2021.01) |
| ***G01N 30/68*** | (2006.01) |
| *F24F 110/65* | (2018.01) |

(56) References Cited

U.S. PATENT DOCUMENTS

| | | | | |
|---|---|---|---|---|
| 2022/0146445 | A1* | 5/2022 | Kimura | G01N 27/128 |
| 2024/0310065 | A1* | 9/2024 | Sathyamurthi | F24F 11/38 |

OTHER PUBLICATIONS

Medina, Jethro and Koban, Mary, "Refrigerant Concentration Mapping Using Real-Time Gas Monitoring; Phase I—Data Collection System Verification" (2021). International Refrigeration and Air Conditioning Conference. Paper 2224.

Application Guide: Gas detection in refrigeration systems.

J. H. Koh and Z. Zakaria, "Hydrocarbons as Refrigerants ? A Review," ASEAN Journal on Science and Technology for Development 34(1), 35-50, 2017.

F. Adelantado, X. Vilajosana, P. Tuset-Peiro, B. Martinez, J. Melia-Segui, and T. Watteyne, "Understanding the Limits of LoRaWAN," IEEE Communications Magazine 55(9): 34-40, 2017.

* cited by examiner

SENSOR AUGMENTATION FOR EARLY DETECTION OF A3 FLAMMABLE REFRIGERANT LEAKS WITH SELF-CHECK AND DIAGNOSTICS

CROSS-REFERENCE TO RELATED APPLICATIONS

This application claims priority to U.S. Provisional Application 63/540,694 filed Sep. 27, 2023, entitled "SENSOR AUGMENTATION FOR EARLY DETECTION OF A3 FLAMMABLE REFRIGERANT LEAKS WITH SELF-CHECK AND DIAGNOSTICS", the entire disclosure of which incorporated herein by reference.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in this invention.

FIELD OF THE INVENTION

The present document relates to electronic circuits. More particularly, the present document concerns sensor based detection of flammable gas leaks.

BACKGROUND

Phase-out of hydrofluorocarbons (HFCs) and the safe transition to low-GWP hydrocarbon/natural refrigerants are critical global issues. Regulatory, business and climate impacts are the main drivers of these changes. The 2019 American Innovation and Manufacturing Act and HFC phasedown regulations are requiring original equipment manufacturers (OEMs) and end users to use alternative refrigerants to reduce greenhouse gas emissions. The natural refrigerants market is expected to grow from $1.5 billion in 2020 to $2.45 billion by 2025 at a 12% CAGR. The global market for low-GWP, environmentally friendly refrigerants is estimated at $25.2 billion in 2022 and is forecast to surpass $73.7 billion by 2032, growing at a CAGR of 11.3% from 2022 to 2032. HFC phasedown and use of low-GWP refrigerants presents an opportunity for a 0.5° C. reduction in global warming, and to lower energy costs for consumers. HVAC, water heating, and refrigeration systems are the largest energy end uses in buildings, using nearly 50% of all energy in US commercial and residential buildings. DOE is supporting US HFC phasedown efforts that target an 85% reduction by 2035 through R&D and testing of low- to zero-GWP technologies.

Propane, with a low GWP of 3, is a strong contender to replace R-134a, which has a much higher GWP of 1,430, in refrigeration equipment. Propane is a natural refrigerant but is also flammable (A3 classification). Therefore, improving safety features within the equipment is crucial so that propane can be used throughout the heating, refrigeration, and air-conditioning industry in all sectors (residential, commercial, and industrial) of the economy.

SUMMARY

The present document concerns implementing systems and methods for operating a sensor system. The sensor system may optionally be added to the equipment as an accessory and/or a plug and play component. The sensor system is located in, on or proximate to equipment (e.g., a home appliance, a vending machine, or an HVAC system). The methods comprise: using a metal mesh disposed around the sensor system to allow air and gasses to enter the sensor system and prevent any heat internal to the sensor system from igniting gases in a surrounding environment; and generating heat within the sensor system to ionize flammable gasses that enter the sensor. The ionization products of any explosive gas, if present, will be absorbed by a conductive sensing material (e.g., tin dioxide). The conductive sensing material may coat at least a portion of a substrate (e.g., an aluminum oxide ceramic tube). The electrical conductivity or resistance of the conductive sensing material will change if it absorbs any of these explosive gas ionization products, and will change back to its original conductivity or resistance once the ionization products are no longer preset. An electronic circuit is provided to: measure the resistance on the conductive sensing material to obtain an indication of a presence or absence of a flammable gas in a surrounding environment; and/or measure any change in the electrical conductivity of the conductive sensing material to obtain an indication of the amount of flammable gas present. The methods also involve: assigning, by a processor, a severity level to an operational state of the equipment based on the measurement(s) made by the electronic circuit; selecting, by the processor, an action from a plurality of different actions based on the severity level which was assigned to the operational state of the equipment; and controlling, by the processor, operations of a robotic actuator or electronic device to perform the action.

The assignment of the severity level can involve: comparing a concentration level of the flammable gas in a surrounding environment to one or more threshold values; and selecting the severity level from the plurality of severity levels based on said comparing. The severity levels can include, but are not limited to, an urgent severity level, a serious severity level and a less serious severity level. One or more threshold values comprise an explosion threshold for the flammable gas. The different actions can include, but are not limited to, opening a window, opening a vent, enabling a ventilation system of a building, actuating a switch to disconnect power from all electrical components of the equipment, controlling a building alert system to cause an evacuation of a building, and notifying a remote monitoring or emergency response station.

The methods may also comprise: detecting, by the processor, a presence of a gas leak from the equipment when a resistance change is received by the electronic circuit from the conductive sensing material; or detecting, by the processor, an absence of the gas leak when no resistance change is received at the electronic circuit or a baseline resistance is measured by the electronic circuit. Additionally or alternatively, the processor can perform self-check operations to: measure the resistance of the conductive sensing material without a presence of the flammable gas; comparing a value of the resistance to a self-check threshold value; and making a decision as to whether a sensor device is operating properly or improperly based on results from comparing the value of the resistance to the self-check threshold value.

The present document also concerns a sensor device for equipment. The equipment can include, but is not limited to, a home appliance, a vending machine, or an HVAC system. The sensor system may be an accessory of the equipment or added to the equipment as a plug and play component.

The sensor device comprises a metal mesh enclosure that surrounds a sensor which will allow surrounding air and gasses to enter the sensor yet prevent heating elements within the sensor from igniting any surrounding explosive gasses. A heating element is configured to ionize the gasses that enter the sensor. The heating element can include, but is not limited to, a nickel-chromium heating element. The sensor device also comprises a conductive sensing material. The conductive sensing material may coat at least a portion of a substrate. The conductive sensing material can include, but is not limited to, tin dioxide. The substrate can include, but is not limited to, an aluminum oxide tube. The conductive sensing material absorbs ionization products from any present flammable gasses. Absorption of these ionization products causes the electrical conductivity of the conductive sensing material to change, and this change is greater with greater absorption. An electronic circuit measures the change in electrical conductivity of the conductive sensing material and/or resistance on the conductive sensing material. The electronic circuit comprises a processor configured to assign a severity level to an operational state of the equipment based on the measured electrical conductivity and/or resistance on the sensor device, select an action from a plurality of different actions based on the severity level which was assigned to the operational state of the equipment, and control operations of an external robotic actuator or electronic device to perform the action.

The processor may also be configured to: detect a presence of a gas leak from the equipment when a resistance change is received by the electronic circuit from the conductive sensing material; or detect an absence of the gas leak when no resistance change is received at the electronic circuit or a baseline resistance is measured by the electronic circuit.

The severity level may be assigned by comparing a concentration level of the flammable gas in a surrounding environment to one or more threshold values and selecting the severity level from the plurality of severity levels based on said comparing. The severity levels can include, but are not limited to, an urgent severity level, a serious severity level and a less serious severity level. The threshold value(s) can include, but is (are) not limited to, an explosion threshold for the flammable gas. The different actions can include, but are not limited to, opening a window, opening a vent, enabling a ventilation system of a building, actuating a switch to disconnect power from all electrical components of the equipment, controlling a building alert system to cause an evacuation of a building, and notifying a remote monitoring or emergency response station.

The processor may be further configured to perform self-check operations to: measure the resistance of the conductive sensing material without a presence of the flammable gas; comparing a value of the resistance to a self-check threshold value; and making a decision as to whether a sensor device is operating properly or improperly based on results from comparing the value of the resistance to the self-check threshold value.

BRIEF DESCRIPTION OF THE DRAWINGS

The present solution will be described with reference to the following drawing figures, in which like numerals represent like items throughout the figures.

DETAILED DESCRIPTION

Figure 1:
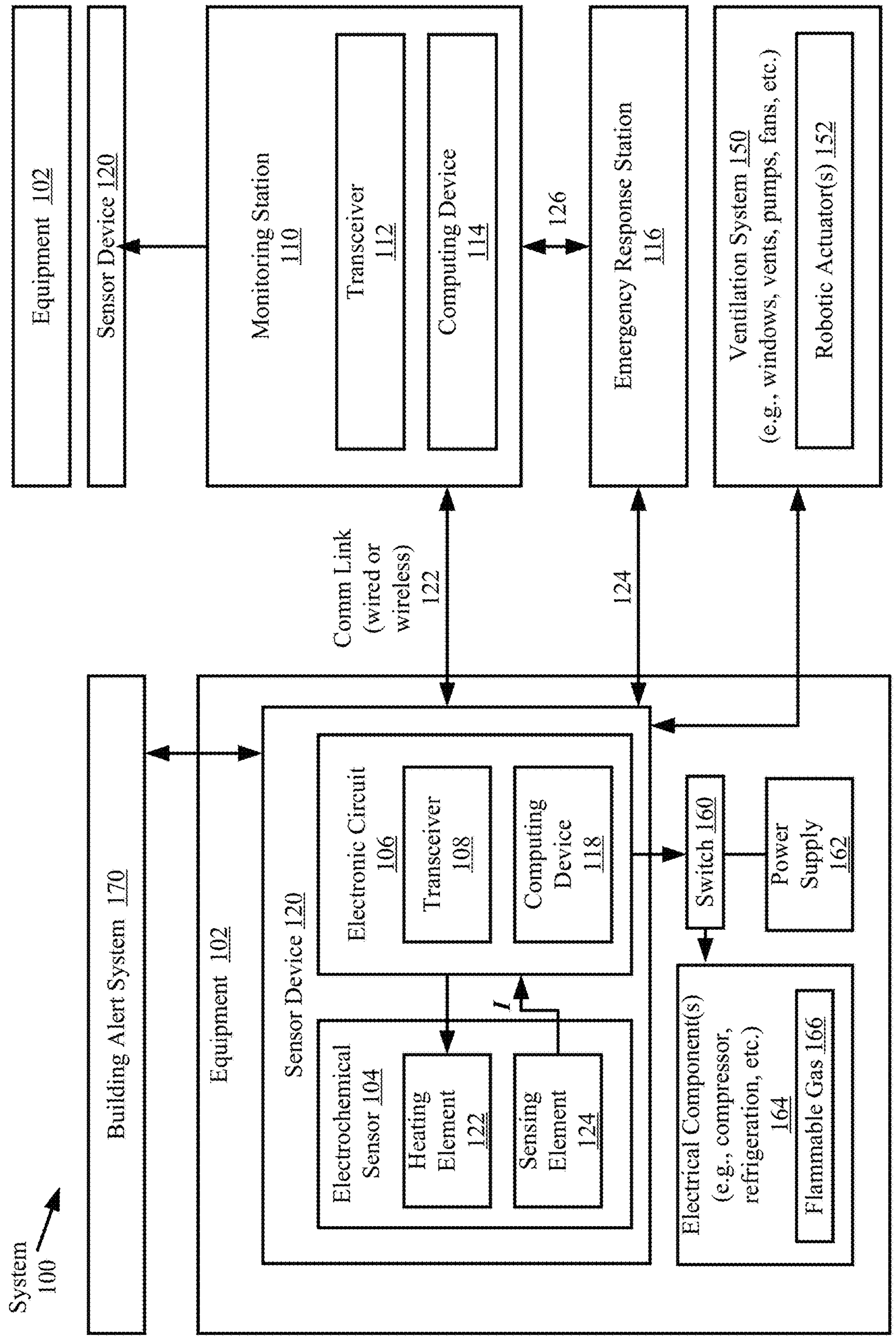
FIG. 1 provides an illustration of a system implementing the present solution.

Manufacturers of refrigeration and heating ventilation and air conditioning (HVAC) equipment both in the residential and commercial space are trending away from high global warming potential (GWP) towards low GWP refrigerants due to climate change, regulatory, public policy, and environmental sustainability pressures. A3 refrigerants have excellent properties but they are highly flammable. All hydrocarbon refrigerants fall under the A3 classification. Propane is an example of an A3 refrigerant with low GWP that is in limited use because of its flammability.

The National Automatic Merchandising Association (NAMA) is the American national trade association representing $31 billion U.S. vending and refreshment services market segment. NAMA has concluded that they have no viable alternatives to using propane in their vending machines. Original Equipment Manufacturers (OEMs) and the HVAC industry are trying to improve the safety of propane-based systems because of regulatory issues. For example, the American Society of heating refrigeration and air conditioning (ASHRAE) standard, and the building safety codes restrict propane charges to 114 g, but bottle coolers require 150 g. OEMs are wary of tighter regulations and safety standards in the US and in the European Union To improve the safety of refrigeration and HVAC systems that use A3 refrigerants, sensor technology is needed that can detect small leaks so that remedial actions can be taken. The sensors should be capable of hourly self-check and diagnostics, require no field calibration, be reliable, be able to communicate with a monitoring station by transmitting data on leak detection or sensor integrity. Developing such sensor-based systems is important to various markets, greenhouse gas (GHG) mitigation, energy efficiency, and product acceptance. Current commercial solutions include: infrared (PIR/NDIR); metal-oxide-semiconductor; catalytic; heated diode; electrochemical cell; Klein tools; and RIDGID Micro Cd-100 Combustible Gas Detector Battery Powered. None of these available products have the capability of self-check, self-diagnostics, field calibration, plug and play, and data transmission. Also, these conventional products are relatively expensive.

The present solution is relatively inexpensive and has the above-listed capabilities (e.g., self-check, self-diagnostics, field calibration, plug and play, and data transmission). The present solution comprises a sensor module with two parts. A first part comprises an electrochemical sensor and associated electronic circuit. The second part comprises a receiver. The electrochemical sensor is configured to generate sensor data including measurements of a concentration of a flammable gas is a surrounding environment. For example, the current level indicates the concentration of the gas in the surrounding environment. A higher current level means that there is a higher concentration of the gas, while a lower current level means that there is a lower concentration of the gas.

The electronic circuit of the first part is configured to detect leak(s) based on the sensor data, self-check itself, perform diagnostics to determine a condition associated with the detected leak(s), and wirelessly send a corresponding signal to the receiver of the second part. The detected leaks can include, but are not limited to, small leakages at less than 5% Lower flammability Limit (LFL). The wireless transmission can be achieved using various technologies (e.g., a telephone line, a satellite signal for remote locations, or via the internet for urban or commercial settings). The receiver is configured to cause a remedial action to be taken based on contents of the received signal. The remedial action can be performed is a relatively quick amount of time from the time of detection (e.g., <5 seconds). The receiver can include output devices to allow remote monitoring by users. The present solution is designed so that no field calibration required.

The present solution allows for appliances and other equipment with improved energy efficiency and use of alternative low-GWP refrigerants. Propane has a GWP=3 and has excellent refrigerant properties. Improving safety of propane-bearing equipment can facilitate a reduction of GHG emissions. The present solution serves DOE energy efficiency (MDEC, kWh/day), GHG reduction (80% by 2050), and climate change objectives (<2° C. rise by 2100). A global phasedown of hydrofluorocarbons (HFCs) is estimated to reduce warming by 0.5° C. by 2100. Adopting propane as a refrigerant may play a significant role in reducing global warming.

The present solution can be used in many applications. Such applications include, but are not limited to, detector applications, sensor applications, energy applications, utility applications, and vending machine applications. The present solution can be used in equipment that is to have a relatively long life (e.g., greater than fifteen years), and meet relatively tight regulations/safety standards (e.g., such as those in the United States and Europe).

FIG. 1 shows an illustrative system 100 implementing the present solution. System 100 is configured to detect flammable refrigerant leaks below the 5% lower flammability limit. Such detections can be made relatively quickly, for example, under one second from the start of a leak. System 100 is also configured to perform intrinsic self-check operations and require no field calibration.

System 100 comprises equipment 102, a monitoring station 110 and an emergency response station 116. The equipment 102 can include, but is not limited to, a home appliance, a vending machine, a refrigerator, a heat pump, HVAC system or a utility device. In some scenarios, equipment 102 is provided with a sensor device 120 (may be an internal or external component). In other scenarios, the sensor device is disposed in proximity to or on the equipment 102. Both scenarios are shown in FIG. 1. Sensor device 120 can be configured as an accessory for the equipment and/or a plug and play (PnP) device to be easily added and removed from the equipment.

Sensor device 120 is generally configured to sense a leak of a flammable gas 166 into a surrounding environment. The flammable gas 166 can include an environmentally friendly low-global warming potential natural refrigerant that can achieve higher energy efficiency and operate at lower costs compared with hydrofluorocarbons. Such natural refrigerants include, but are not limited to, propane. Other gases (such as isobutane or hydrogen) could additionally or alternatively be sensed by the sensor device 120.

Because of its flammability, propane is mainly used in secondary and cascade refrigeration systems in supermarkets and chillers. Further adoption and market penetration depends on improved equipment safety because of tight safety standards from regulators and building codes. Sensor device 120 can provide OEMs and end users with increased safety features and optionality. Adoption of the present solution for propane (which has a global warming potential of 3) can help reduce global warming relative to the use of hydrofluorocarbons.

In order to improve safety of the equipment 102, sensor device 120 is provided to detect gas leaks before the flammable gas 166 spreads throughout a building or facility. Accordingly, sensor device 120 comprises an electromechanical sensor 104 and an electronic circuit 106 with a transmitter 108. The particulars of the electromechanical sensor will become evident as the discussion progresses. Still, it should be understood that the electronic circuit 106 comprises a transceiver 108 and a computing device 118. Computing device 118 has installed thereon software operative to facilitate operation of the system. Such operations can include, but are not limited to, operations to self-check an operational state of the electromechanical sensor 104, reporting of self-check results, operations to convert sensor data from a first format (e.g., a raw data format) to a second different format (e.g., a numerical or textual format), operations to detect a gas leak based on the sensor data, operations to take remedial measures and/or cause remedial measures to be taken, and/or operations to communicate the sensor data and/or other information to remote devices. Computing device 118 can include, but is not limited to, a microchip computer and/or processor. It should be noted that some of the listed operations can additionally or alternatively be performed by the remote device(s) as discussed below.

The self-check operations can involve: causing a signal to be generated by the sensing element 124 of the sensor device 120 detecting a level of the output signal; comparing the detected level of the output signal to threshold value(s); and making a decision as to the operational state of the sensor device 120 based on results of the comparing. The computing device 118 can conclude that the sensor device 120 is operating properly when the detected level of its output signal is above threshold value $thr_{self\text{-}check}$ or conclude that sensor is operating improperly when the detected level of its output signal is below the threshold value $thr_{self\text{-}check}$.

The remedial measure operations can involve: controlling switch 160 to disconnect a power supply 162 from electrical component(s) 164 of the equipment 102; controlling a robotic actuator 152 to turn ON or otherwise enable a ventilation system 150 (e.g., open window(s), open fan(s), enable pump(s), turn ON fan(s), etc.); controlling a building alert system 170; and/or communicating an alert to monitoring station 110 and/or emergency response station 116.

The type of remedial measure can be selected based on thresholding. For example, an explosion threshold $thr_{urgent}$ is known and considered an urgent alert threshold. Another lower threshold is defined as a serious alert threshold $thr_{serious}$, while yet another even lower threshold is defined as a less serious threshold $thr_{less\text{-}serious}$ (e.g., $thr_{urgent}>thr_{serious}>thr_{less\text{-}serious}$). The computing device 118 can select a remedial measure from a plurality of different remedial measures using the thresholds $thr_{urgent}$, $thr_{serious}$ and $thr_{less\text{-}serious}$.

When the sensor data output from the electromechanical sensor 104 indicates that the concentration level of the flammable gas in the surrounding environment exceeds or is equal to $thr_{urgent}$, then a first severity level (e.g., an urgent severity level) is assigned to the detected gas leak or an operational state of the equipment 120. An alert signal is also sent to the monitoring station 110 and the emergency response station 116. The alert signal notifies a user of the monitoring station 110 and/or an emergency responder of the detected propane leak at equipment 102. A building alert system can also be automatedly enabled to cause an immediate evacuation of the building.

When the sensor data output from the electromechanical sensor 104 indicates that the concentration level of the flammable gas in the surrounding environment is between $thr_{urgent}$ and $thr_{serious}$, then a second severity level (e.g., a serious severity level) is assigned to the detected gas leak or the operational state of the equipment 120. An alert signal is also sent to the monitoring station 110 so that a repair person can be deployed to fix the equipment in a relatively short period of time. The robotic actuator 152 can also be controlled to cause widows/vents to be opened and fans to be enabled so that air is blown into the building and exhausted from the building.

When the sensor data output from the electromechanical sensor 104 indicates that the concentration level of the flammable gas in the surrounding environment is between $thr_{serious}$ and $thr_{less\text{-}serious}$, then a third severity level (e.g., a less-serious severity level) is assigned to the detected gas leak or the operational state of the equipment 120. An alert signal is also sent to the monitoring station 110 so that a repair person can be deployed to fix the equipment in a certain amount of time. The robotic actuator 152 can also be controlled to cause widows/vents to be opened, but the fans are not enabled.

Computing device 118 may also be configured to monitor the concentration level of gas in the surrounding environment over time. Based on the rate of increased concentration level, the computing device 118 can make a prediction as to which component is the source of the gas leak. This prediction can be communicated to the monitoring station 110 and/or used as criteria for selecting a remedial measure from the plurality of different remedial measures. For example, it is predicted that the gas tank is leaking when the concentration remains at a first level for a given duration (e.g., 30 seconds). Alternatively, it is predicted that a gas line is leaking when the concentration remains at a second lower level for a given duration (e.g., 30 seconds). The present solution is not limited to the particulars of this example.

The monitoring station 110 is remotely located from the equipment 102 and comprises a transceiver 112 to receive signals from the equipment 102 via communication link 122. Communication link 122 can be wired or wireless. Any wired or wireless communication technology can be used here. For example, low range (LoRa) technology can be used. LoRa is a wireless modulation technique derived from chirp spread spectrum technology and is used extensively in IoT. The modulation technique encodes information on radio waves using chirp pulses. LoRa-modulated transmission is robust against disturbances. Other communication technologies that can be used here include, for example, satellite communications technology and/or telephone communication technology. Monitoring system 110 also comprises a computing device 114 that has installed software operative to facilitate operation of the system. Such operations can include, but are not limited to, operations to detect a gas leak based on the sensor data, and/or operations to take remedial measures and/or cause remedial measured to be taken. These operations can be the same as or similar to those described above. Computing device 114 can include, but is not limited to, a processor, a portable computer, and/or a desktop computer.

The emergency response station 116 is remotely located from the equipment 102 and comprises a transceiver 112 to receive signals from the equipment 102 via communication link 124 and/or monitoring station 110 via communication link 126. Communication links 124, 126 can be wired or wireless. Any wired or wireless communication technology can be used here. Communication links 122, 124, 126 can employ the same or different communication technology. The emergency response station 116 can include, but is not limited to, a police department station, a fire department station, and/or other first responder station.

To optimize the safe use of propane, early detection of leaks is important to reduce flammability risk of propane. Four important metrics to reduce risks include: (1) the fidelity of the sensor and its ability to self-check, (2) the level of detection, (3) how quickly a leak is detected at a particular concentration level, and (4) data transmission via LoRa.

Sensor Platform Architecture, Metrics, and Measurements

Figure 2A:
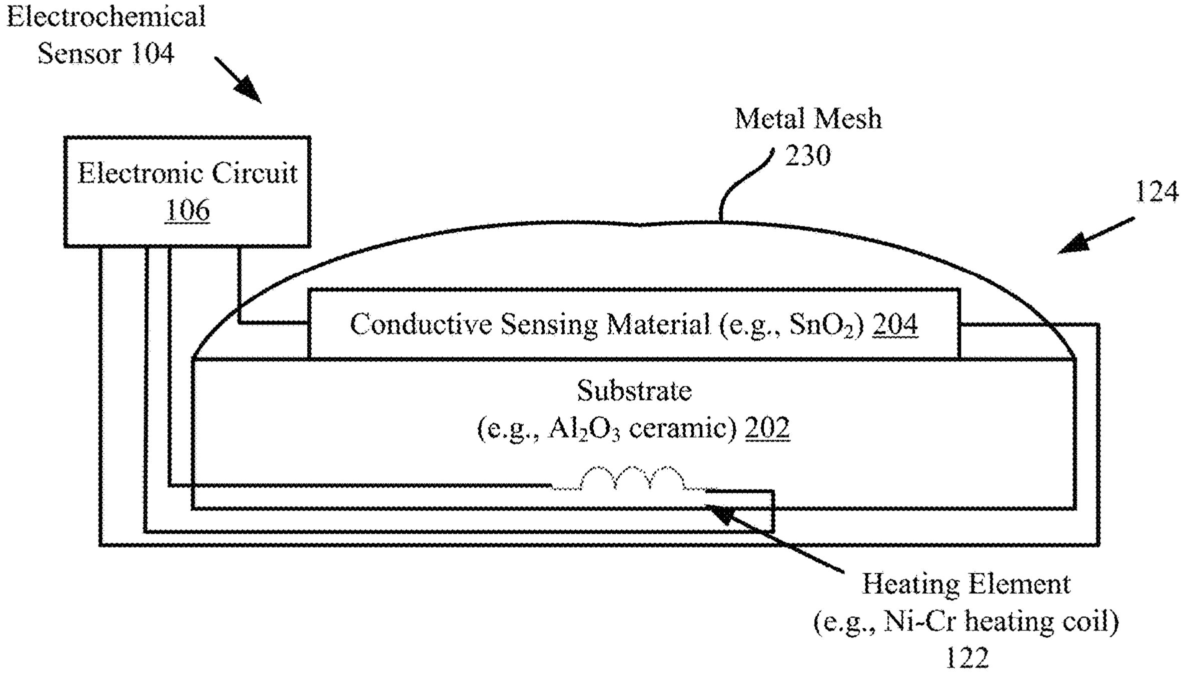
FIGS. 2A-2B (collectively referred to herein as "FIG. 2") provide illustration that are useful for understanding how a sensor device of the present solution operates.
Figure 2B:
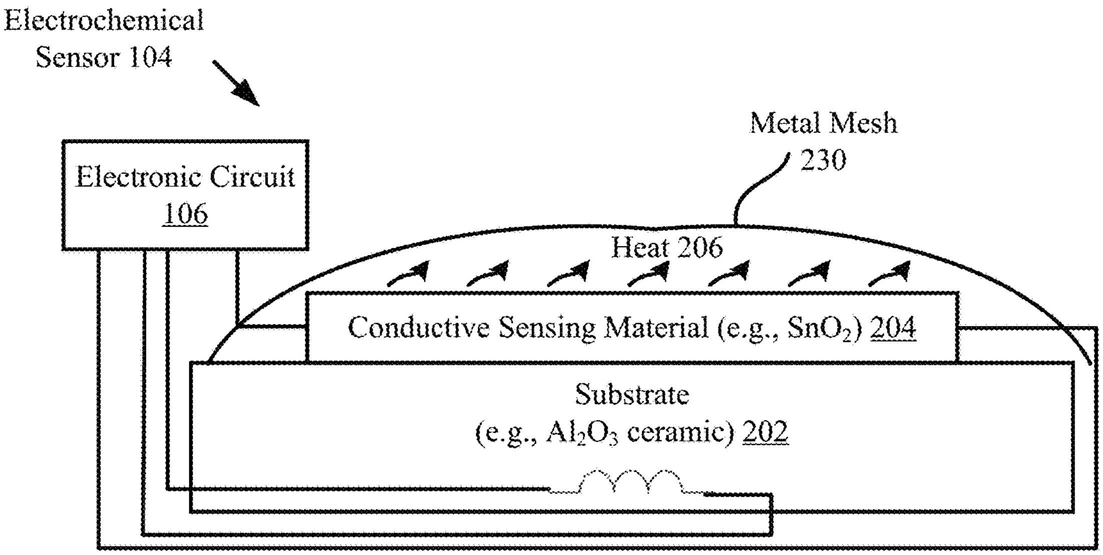

The electrochemical sensor 104 is configured for a rapid reaction with a flammable gas (e.g., propane, isobutane or hydrogen). The electrochemical sensor 104 can include, but is not limited to, an MQ 2 gas sensor. In the MQ 2 gas sensor scenario, the electrochemical sensor 104 comprises a heating element 122 and a sensing element 124. A more detailed schematic illustration of the electrochemical sensor 104 is provided in FIG. 2. As shown in FIG. 2A, the sensing element 124 is formed of a substrate 202 (e.g., $Al_2O_3$) coated with a conductive sensing material 204 (e.g., $SnO_2$). The sensing element 124 acts as the gas sensor. The heating element 122 is disposed inside the substrate 202. The heating element 122 can include, but is not limited to, a heating coil (e.g., a small Ni—Cr heating coil). When current is supplied from electronic circuit 106 to the heating element 122, it generates heat 206 to make sure that the electrochemical sensor 104 is at a working temperature.

When a flammable gas interacts with the electrochemical sensor 104, the heat ionizes the flammable gas. This ionization allows the conductive sensing material 204 to absorb the flammable gas ionization products. The absorption causes a change in resistance on the electrochemical sensor 104. The electronic circuit 106 can detect the resistance based on the output signal received from the electrochemical sensor 104.

The self-check feature of the sensor ensures that the heating element 122 maintains its integrity for the process to work. As noted above, the self-check feature is implemented by computing device 118. Signal transmission is achieved using transceiver 108. Chirp spread spectrum technology can be employed for signal transmission. For example, a LoRa radio may be used for transceiver 108. The LoRa radio is configured to encode information on radio waves using chirp pulses. LoRa radios use the unlicensed 902-928 MHz band and thus do not require any licensing fees. The monitoring organization would need a receiving unit to watch for alarms, or commercial reception service can be purchased to send messages to the customer through the internet. The radio link range can be several miles thus a single receiving station can cover several square miles. For shorter range requirements, the transmitter power can be reduced to enable more frequency re-use.

Computing device 118 may include a microchip that is programmed to communicate with the electromechanical sensor 104 and the transmitter 108. The computing device may perform sensor self-checks periodically (e.g., every 5 seconds) or in a non-periodic manner (e.g., varied arbitrarily via software modification). A voltage output from the sensing element 124 indicates that the electromagnetic sensor 104 is working properly. For example, if this output goes to zero, then the electromagnetic sensor 104 has failed. This robust self-check technology is inexpensive and provides more capability and flexibility relative to other sensors available on the market. The electromagnetic sensor 104 is also PnP and thus can be easily removed and replaced, if needed.

The electromagnetic sensor 104 was tested in a laboratory setting. When a flammable gas contacted the electromagnetic sensor 104 (via a rubber tube from a calibrated gas cylinder to a sensor head), a current was generated thereby. A corresponding voltage was displayed on a terminal emulator (e.g., Putty, which is freeware). The voltage depends on the concentration of the flammable gas. The test involved releasing calibrated amounts of gases traceable to the National Institute for Standards Technology (NIST) standards at flammability limits of 47.61% LFL (1% propane+air), 28.57% of LFL (0.6% propane+air), and 4.76% of LFL (0.1% propane+air). The response times of the electromagnetic sensor 104 were less than one second. Representative data with response times are shown in below TABLE 1. The response times are for propane+air concentrations of 47.61% LFL, 28.57% LFL, and 4.76% LFL, with the concentrations traceable to NIST standards provided by the manufacturer. Modules #1, #2 and #3 refer to three sensors from the same manufacturer. The response times of each of the three discrete sensors (same model and manufacturer) is less than one second at a 95% confidence interval (C.I.). For the lowest concentration of propane (4.76% LFL, or 0.1% propane in air), the average response time is 0.386 s+0.03 seconds. Standard statistical methods were used for calculating C.I. The data demonstrates that the level of detection is below 5% LFL and the presence of propane is detected within 0.5 seconds.

TABLE 1

Sensor response times at three levels of propane + air concentrations

| | Module #1 | Module #2 | Module #3 |
|---|---|---|---|
| | Sensor response times after exposure to 47.61% LFL (1% propane + air) | | |
| Average time, s | 0.37 | 0.43 | 0.36 |
| Std. dev., s | ±0.12 | ±0.13 | ±0.07 |
| 95% C.I., α = 0.5 | ±0.06 | ±0.05 | ±0.03 |
| | Sensor response times after exposure to 28.57% LFL (0.6% propane + air) | | |
| Average time, s | 0.34 | 0.34 | 0.33 |
| Std. dev., s | ±0.03 | ±0.04 | ±0.06 |
| 95% C.I., α = 0.5 | ±0.02 | ±0.02 | ±0.03 |
| | Sensor response times after exposure to 4.76% LFL (0.1% propane + air) | | |
| Average time, s | 0.41 | 0.41 | 0.34 |
| Std. dev., s | ±0.07 | ±0.07 | ±0.04 |
| 95% C.I., α = 0.5 | ±0.03 | ±0.03 | ±0.02 |

Figure 3:
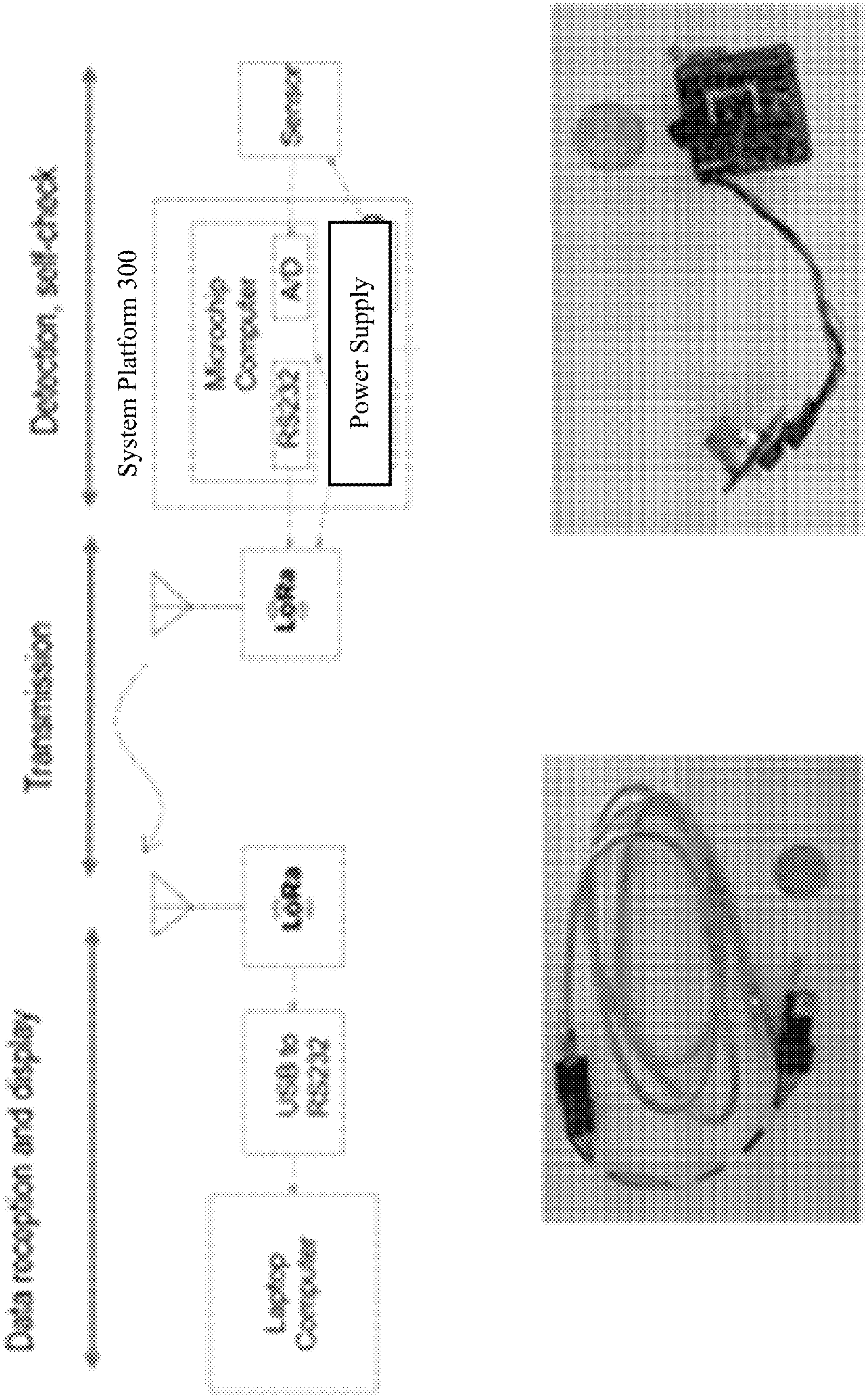
FIG. 3 provides an illustration of a test system for the present solution.

The computing device 118 was programmed to take a reading every five seconds to check the sensor and to check the voltage reading from the sensor above a certain threshold level when no propane is present. The threshold was approximately 0.4 Volts. As soon as propane was detected, the voltage spikes-which was relayed via a LoRa transmitter to a receiver connected to a laptop and displayed using Putty. Putty is a Secure Shell (SSH) and telnet client and is open source. Putty is used as a communication vehicle between the host system (e.g., a laptop) and the system command-line interface. The combination of the sensor, transceiver, microprocessor, and software used in the test is shown in FIG. 3.

Figure 4:
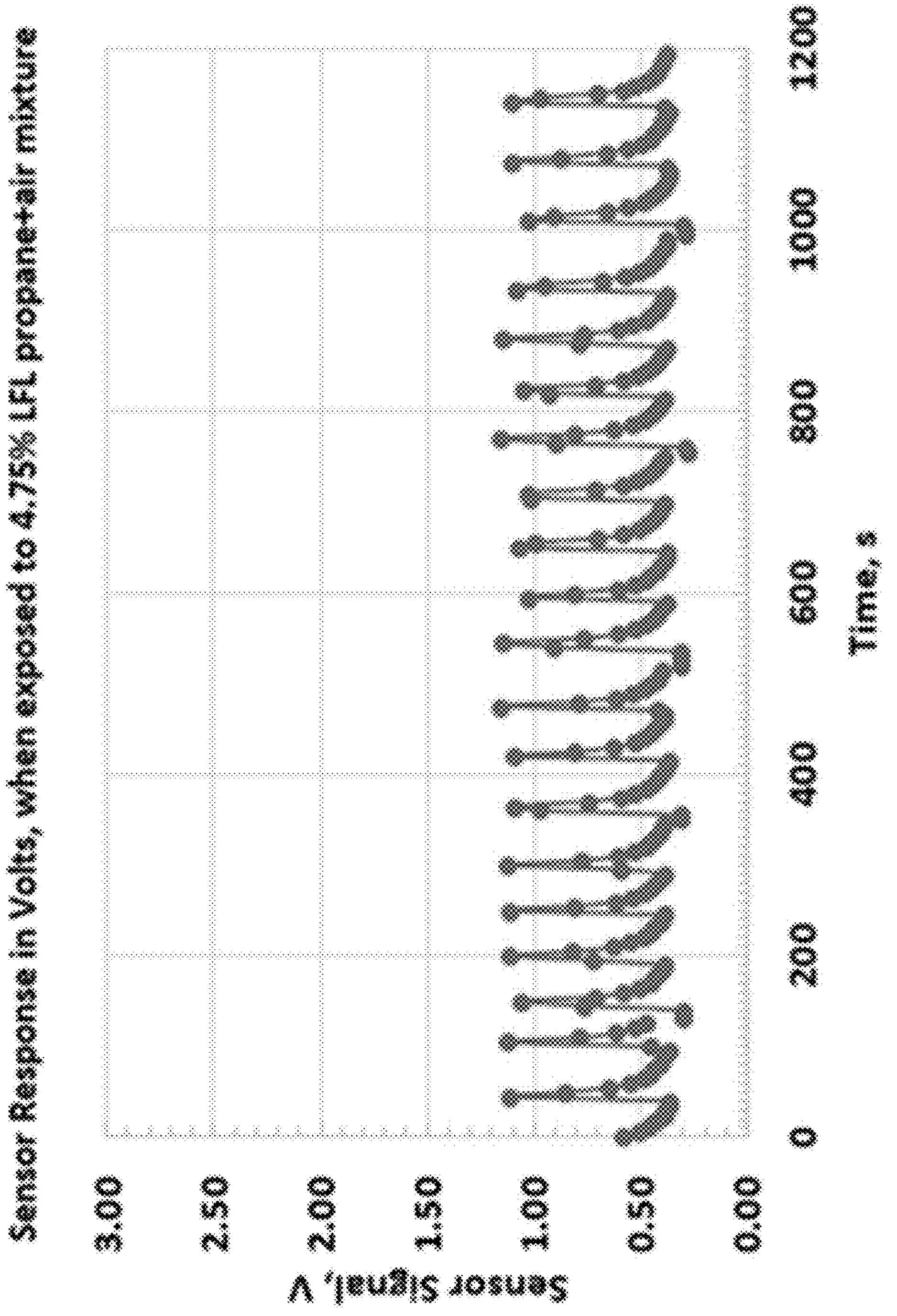
FIG. 4 provides a graph plotting detection levels on an x-axis and sensor response times on a y-axis.
Figure 5:
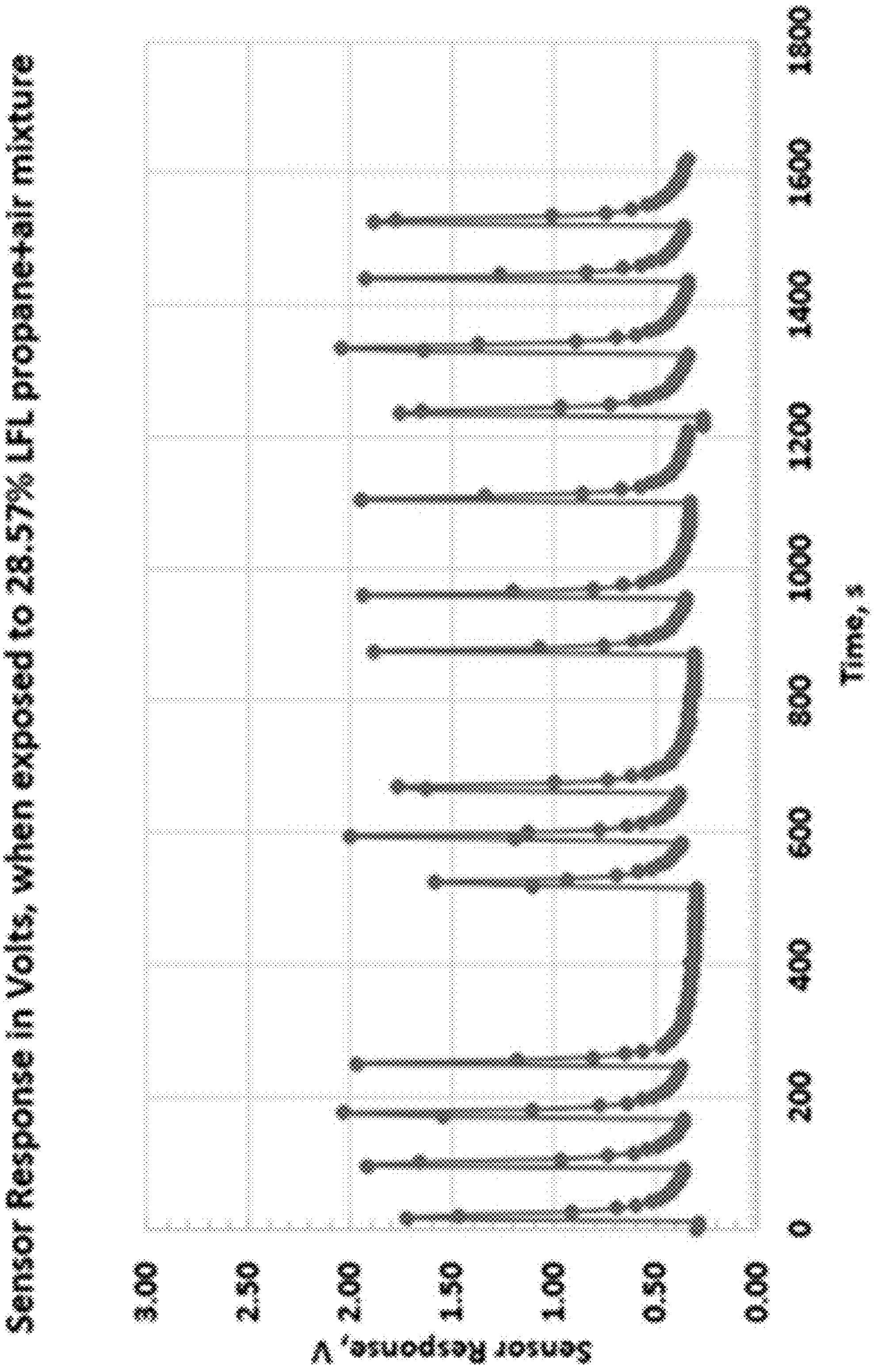
FIG. 5 provides a graph plotting sensor response on the x-axis and response time on the y-axis.
Figure 6:
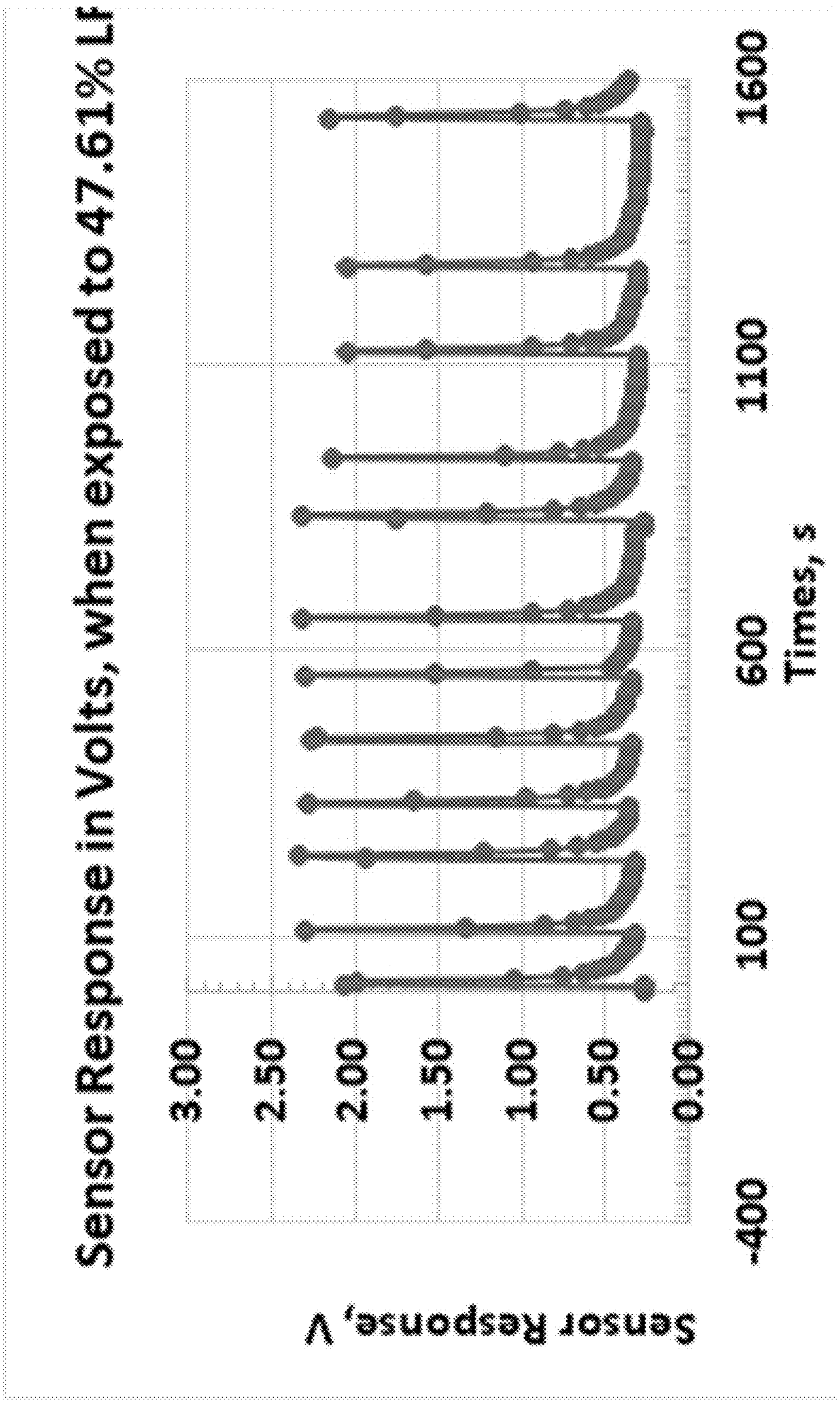
FIG. 6 provides a graph plotting sensor response time on the x-axis and response time on the y-axis.

The response of the sensor platform 300 to propane at the three distinct concentration levels is shown in FIGS. 4-6. The rapid detections of propane at the three distinct concentration levels are similar, as confirmed by the values in TABLE 1 and FIGS. 4-6, and the sensor returns to its baseline level of 0.3 Volts in about 90 seconds. This pattern of repeated propane detection and returning to the baseline case is evident in FIGS. 4-6, demonstrating the sensor's repeatability and fidelity.

Figure 7:
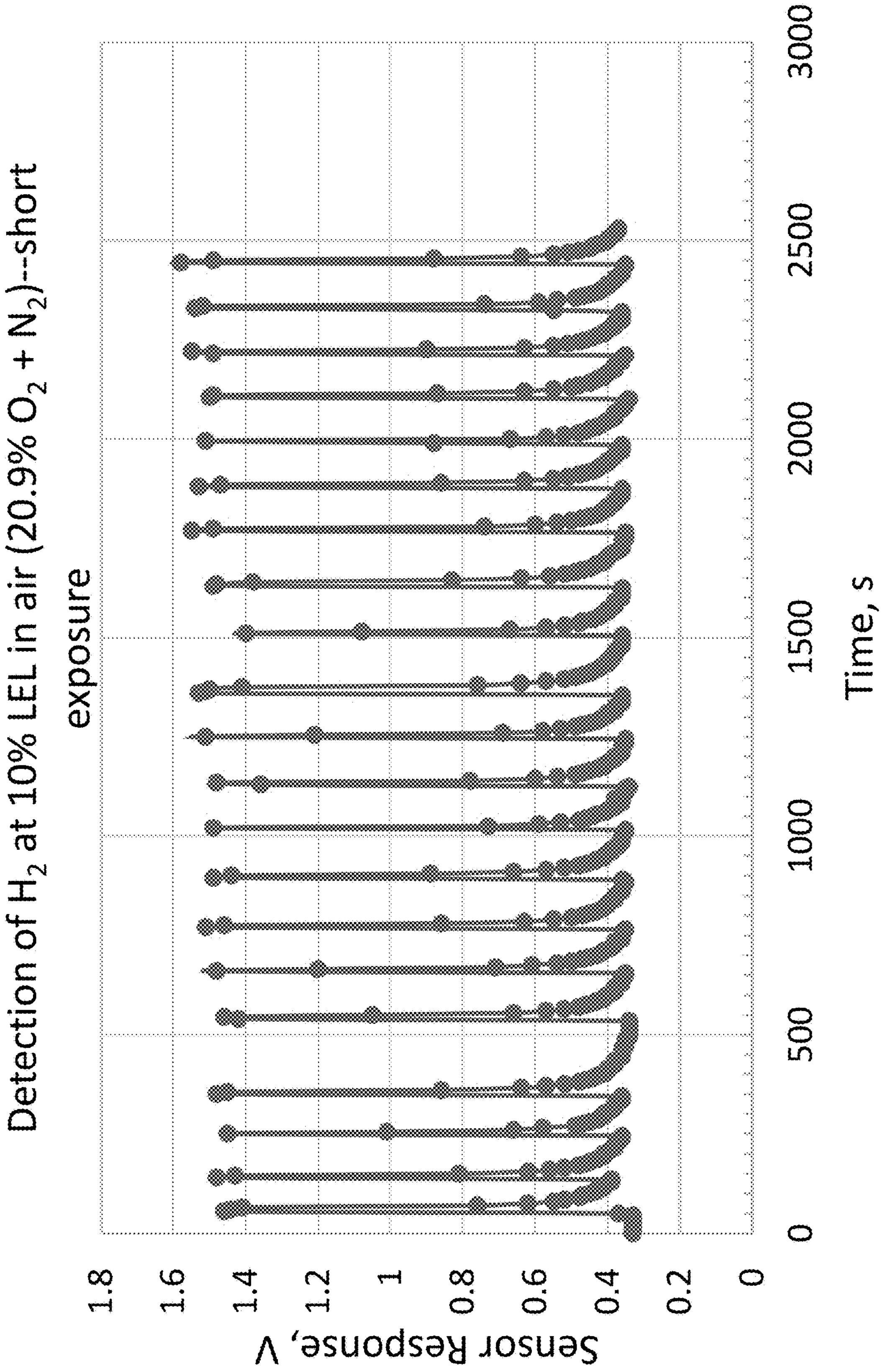
FIGS. 7-8 provide graphs showing the present solutions ability to detect hydrogen.
Figure 8:
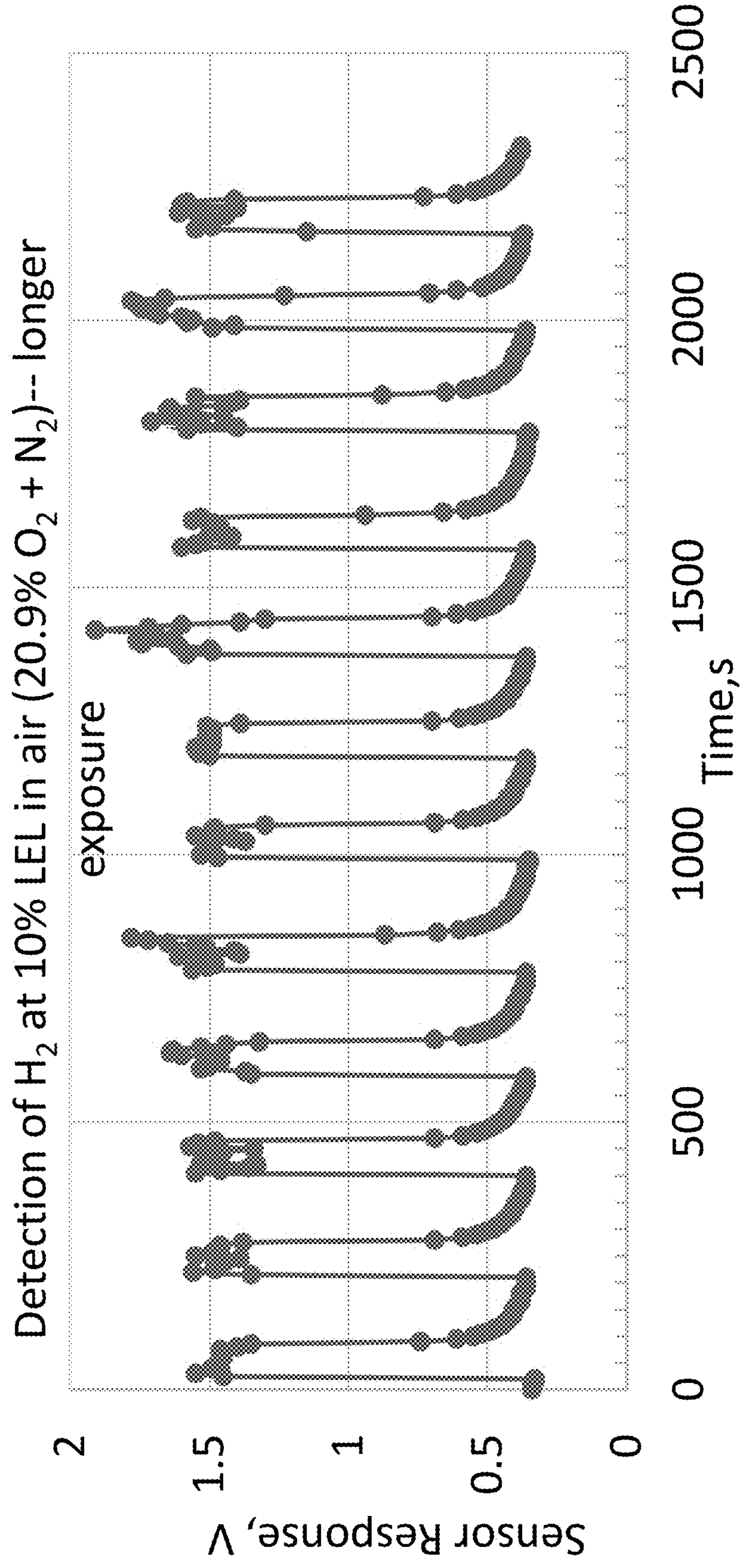

FIGS. 7-8 provide graphs showing the present solutions ability to detect hydrogen.

Figure 9:
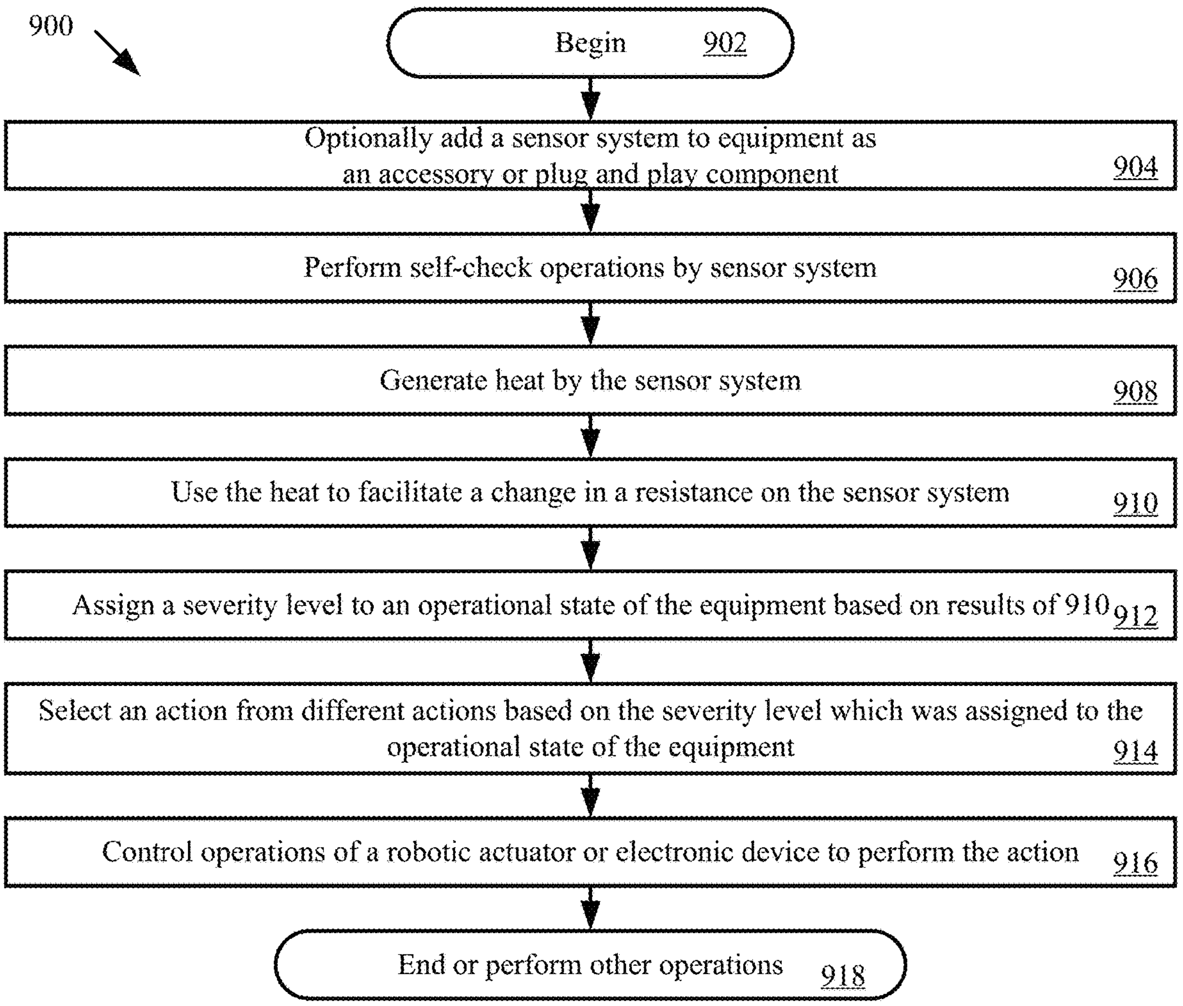
FIG. 9 provides a flow diagram of an illustrative method for operating a system.

FIG. 9 provides a flow diagram of an illustrative method 900 for operating a system with equipment (e.g., equipment 120 of FIG. 1) employing flammable gas (e.g., flammable gas 166 of FIG. 1). The equipment can include, but is not limited to, a home appliance, a vending machine, or an HVAC system.

Method 900 begins with 902 and continues with 904 a sensor system is added to the equipment as an accessory or a plug and play component. The sensor system then performs self-check operations in 906 to: cause the resistance of the conductive sensing material without a presence of the flammable gas; comparing a value of the resistance to a self-check threshold value; and making a decision as to whether a sensor device is operating properly or improperly based on results from comparing the value of the resistance to the self-check threshold value.

In 908, heat is generated internal to the sensor system. The heat is used in 910 to ionize gases nearby the sensing element such that the sensing element can absorb the ionized gasses. If the nearby gasses are flammable gas (e.g., propane), the sensing element resistance changes. It should be noted that the sensor system comprises a metal mesh (e.g., metal mesh 230 of FIG. 2) disposed therearound to allow air and gasses to enter the sensor system and prevent any heat internal to the sensor system from igniting gases in a surrounding environment. The resistance on the sensing element (or more particularly, the conductive sensing material) is measured to obtain an indication of a presence or absence of a flammable gas in a surrounding environment.

In 912, a processor (e.g., computing device 118 of FIG. 1) performs operations to assign a severity level to an operational state of the equipment based on results of 910 (e.g., a resistance on the sensor system). These operations can include, but are not limited to: detecting a presence of a gas leak from the equipment when the resistance on the sensor system falls within a first threshold range; or detecting an absence of the gas leak when the resistance of the sensor system falls outside of the threshold range. Responsive to the detection of the gas leak, the system can then obtain the concentration level of the flammable gas in the surrounding environment (e.g., measure the resistance of the conductive sensing material), compare the same to one or more threshold values, and select the severity level from the plurality of severity levels based on said comparing. The severity levels can include, but are not limited to, an urgent severity level, a serious severity level and a less serious severity level. The urgent severity level is assigned to the equipment operational state when the concentration level of the flammable gas exceeds a highest threshold value. In contrast, the less serious severity level is assigned to the equipment operational state when the concentration level of the flammable gas is less than a lowest threshold value. The serious severity level is assigned to the equipment operational state when the concentration level of the flammable gas falls between the highest threshold value and the lowest threshold value. One of the threshold values (e.g., the highest threshold value) may comprise an explosion threshold for the flammable gas.

In 914, the processor performs operations to select an action from a plurality of different actions based on the severity level which was assigned to the operational state of the equipment. The different actions include, but are not limited to, opening a window, opening a vent, enabling a ventilation system of a building, actuating a switch to disconnect power from all electrical components of the equipment, controlling a building alert system to cause an evacuation of a building, and notifying a remote monitoring or emergency response station. For example, the processor performs operations to: enable an alert system to have a building evacuated when the urgent severity level is assigned to the equipment's operational state; cause a window to be opened and fans to be turned on when the serious severity level is assigned to the equipment's operational state; and/or cause the window to open and maintain the fans in their off states when the less serious severity level is assigned to the equipment's operational state. A notification signal can be sent from the sensor system to a remote device in addition to or as an alternative to any of the listed operations. A repairman may also be deployed to further diagnose and repair the gas leak in addition to or as an alternative to any of the listed operations.

The processor then performs operations in 916 to control operations of a robotic actuator (e.g., robotic actuator 152 of FIG. 1) or electronic device (e.g., monitoring station 110, emergency response station 116, switch 160 and/or building alert system 170 of FIG. 1) to perform the action. Subsequently, method 900 continues with block 918 where it ends or other operations are performed.

Figure 10:
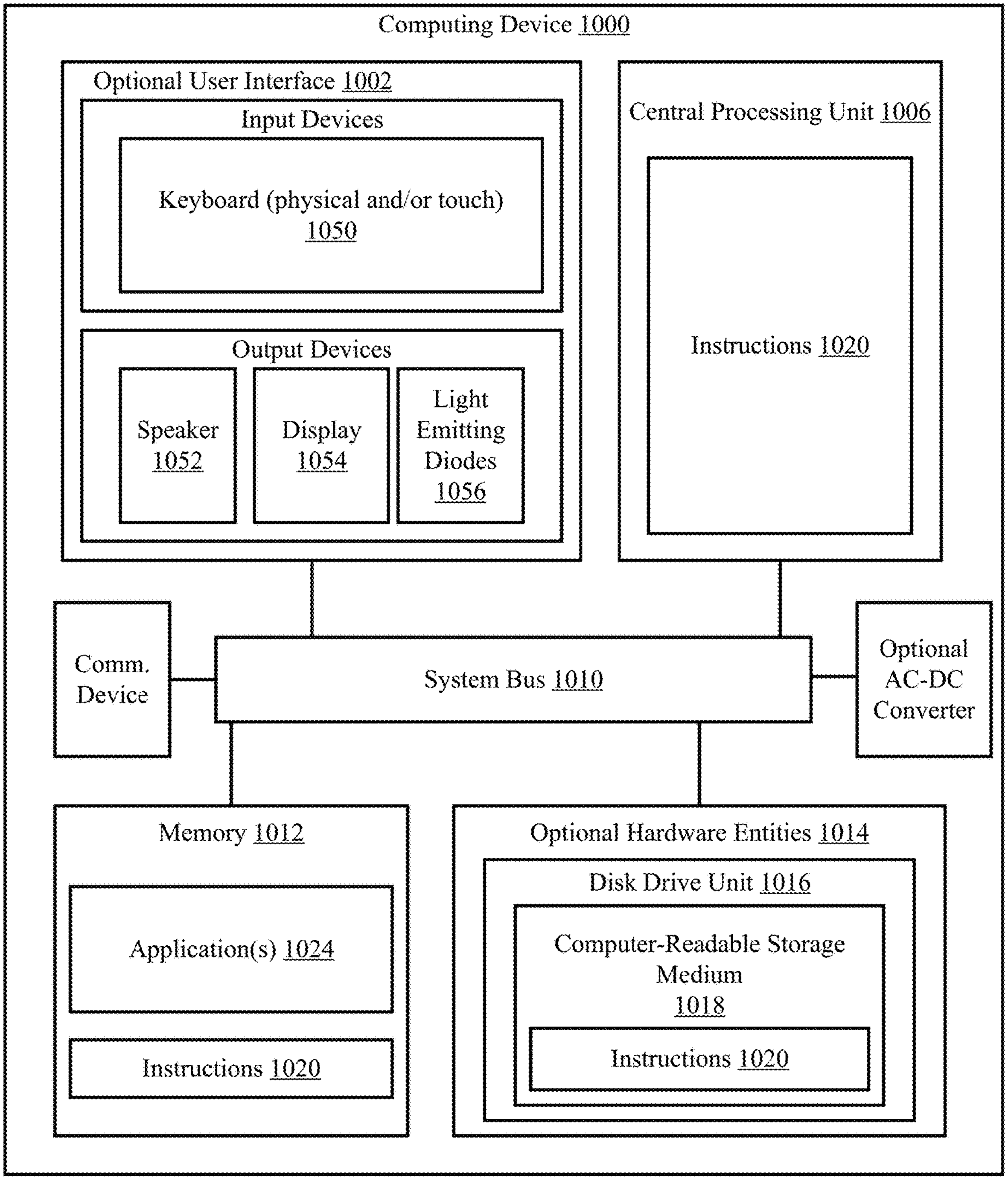
FIG. 10 provides a block diagram of an illustrative computing device.

FIG. 10 provides an illustration of an exemplary architecture for a computing device 300. Computing devices 114 and/or 118 of FIG. 1 (is)are the same as or similar to computing device 1000. As such, the discussion of computing device 1000 is sufficient for understanding these components of system 100.

Computing device 1000 may include more or less components than those shown in FIG. 10. However, the components shown are sufficient to disclose an illustrative solution implementing the present solution. The hardware architecture of FIG. 10 represents one implementation of a representative computing device configured to enable normalizing identity claims across disparate identity directories as described herein. As such, the computing device 1000 of FIG. 10 implements at least a portion of the method(s) described herein.

Some or all the components of the computing device 1000 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 10, the computing device 1000 comprises a user interface 1002, a Central Processing Unit (CPU) 1006, a system bus 1010, a memory 1012 connected to and accessible by other portions of computing device 1000 through system bus 1010, and hardware entities 1014 connected to system bus 1010. The user interface can include input devices and output devices, which facilitate user-software interactions for controlling operations of the computing device 1000. The input devices include, but are not limited, a physical and/or touch keyboard 1050. The input devices can be connected to the computing device 1000 via a wired or wireless connection (e.g., a Bluetooth® connection). The output devices include, but are not limited to, a speaker 1052, a display 1054, and/or light emitting diodes 1056.

At least some of the hardware entities 1014 perform actions involving access to and use of memory 1012, which can be a Radom Access Memory (RAM), a disk driver and/or a Compact Disc Read Only Memory (CD-ROM). Hardware entities 1014 can include a disk drive unit 1016 comprising a computer-readable storage medium 1018 on which is stored one or more sets of instructions 1020 (e.g., software code) configured to implement one or more of the methodologies, procedures, or functions described herein. The instructions 1020 can also reside, completely or at least partially, within the memory 1012 and/or within the CPU 1006 during execution thereof by the computing device 1000. The memory 1012 and the CPU 1006 also can constitute machine-readable media. The term "machine-readable media", as used here, refers to a single medium or multiple media (e.g., a centralized or distributed database, and/or associated caches and servers) that store the one or more sets of instructions 1020. The term "machine-readable media", as used here, also refers to any medium that is capable of storing, encoding or carrying a set of instructions 1020 for execution by the computing device 1000 and that cause the computing device 1000 to perform any one or more of the methodologies of the present disclosure.

In some scenarios, the hardware entities 1014 include an electronic circuit (e.g., a processor) programmed for facilitating content sharing amongst users. In this regard, it should be understood that the electronic circuit can access and run application(s) 1024 installed on the computing device 1000. The functions of the software application(s) 1024 are apparent from the above discussion of the present solution. For example, the software application is configured to perform one or more of the operations described above.

The invention as shown in the drawings and described in detail herein disclose arrangements of elements of particular construction and configuration for illustrating preferred embodiments of structure and method of operation of the present invention. It is to be understood however, that elements of different construction and configuration and other arrangements thereof, other than those illustrated and described may be employed in accordance with the spirit of the invention, and such changes, alternations and modifications as would occur to those skilled in the art are considered to be within the scope of this invention as broadly defined in the appended claims. In addition, it is to be understood that the phraseology and terminology employed herein are for the purpose of description and should not be regarded as limiting.

We claim:

1. A method for operating a sensor system, comprising:

adding the sensor system to equipment as an accessory or a plug and play component;

using a metal mesh disposed around the sensor system to allow air and gas es to enter the sensor system;

supplying current from an electronic circuit to a coil disposed inside a substrate to which the metal mesh is coupled;

generating heat, by the coil, to ionize flammable gasses that enter the sensor system through the metal mesh;

absorbing the ionized flammable gasses by a conductive sensing material to cause a change in resistance on the conductive sensing material, the conductive sensing material being disposed on the substrate and located between the substrate and the metal mesh;

measuring, by the electronic circuit, the resistance on the conductive sensing material to obtain an indication of a presence or absence of a flammable gas in a surrounding environment;

considering a measured value of resistance to be a concentration level of flammable gas;

assigning, by a processor, a severity level to an operational state of the equipment based on results of thresholding using the concentration level of flammable gas and a plurality of threshold concentration levels of flammable gas;

monitoring, by the processor, the concentration level of the flammable gas over time;

predicting, by the processor, which component of the equipment is a source of a gas leak based on a rate of increased concentration level of the flammable gas in the surrounding environment;

selecting, by the processor, an action from a plurality of different actions based on the severity level which was assigned to the operational state of the equipment and based on a prediction as to which component of the equipment is the source of the gas leak; and controlling, by the processor, operations of a robotic actuator or electronic device to perform the action;

wherein a prediction is made that (i) a gas tank is the source of the gas leak when the concentration level of flammable gas increases to a first level and remains at the first level for a given duration and (ii) a gas line is the source of the gas link when the concentration level of flammable gas increases to a different second level and remains at the second level for the given duration.

2. The method according to claim 1, further comprising:

detecting, by the processor, a presence of the gas leak from the equipment when a resistance change is received at the electronic circuit from the conductive sensing material, or detecting, by the processor, an absence of the gas leak when no resistance change is received at the electronic circuit.

3. The method according to claim 1, wherein the plurality of different actions comprise opening a window, opening a vent, enabling a ventilation system of a building, actuating a switch to disconnect power from all electrical components of the equipment, controlling a building alert system to cause an evacuation of a building, and notifying a remote monitoring or emergency response station.

4. The method according to claim 1, wherein the assigning comprises comparing a concentration level of the flammable gas in a surrounding environment to one or more threshold values of the plurality of threshold concentration levels of flammable gas and selecting the severity level from the plurality of severity levels based on said comparing.

5. The method according to claim 4, wherein the plurality of severity levels comprise an urgent severity level, a serious severity level and a less serious severity level.

6. The method according to claim 4, wherein the one or more threshold values comprise an explosion threshold for the flammable gas.

7. The method according to claim 1, further comprising performing, by the processor, self-check operations to: measure a resistance of the conductive sensing material without a presence of the flammable gas; comparing a value of the resistance to a self-check threshold value; and making a decision as to whether a sensor device is operating properly or improperly based on results from comparing the value of the resistance to the self-check threshold value.

8. The method according to claim 1, wherein the equipment comprises a home appliance, a vending machine, or an HVAC system.

9. The method according to claim 1, wherein the resistance is changed due to absorption of the ionization products of the flammable gas by a conductive sensing material of the sensor system.

10. A sensor device for equipment, comprising:

a metal mesh coupled to a substrate;

a conductive sensing material disposed on the substrate and located between the substrate and metal mesh;

a heating element comprising a coil disposed inside the substrate at a location near the conductive sensing material and configured to generate heat to ionize any nearby flammable gasses and allow ionization products to be absorbed by the conductive sensing material to change a resistance on the sensor device which indicates a presence or absence a flammable gas in a surrounding environment;

the electronic circuit configured to supply current to the coil, and measure the resistance on the conductive sensing material to obtain an indication of the presence or absence of the flammable gas in the surrounding environment, wherein a measured value of resistance is considered to be a concentration level of flammable gas; and a processor configured to assign a severity level to an operational state of the equipment based on results of thresholding using the concentration level of flammable gas and a plurality of threshold concentration levels of flammable gas monitor the concentration level of the flammable gas over time, predict which component of the equipment is a source of a gas leak based on a rate of increased concentration level of the flammable gas in the surrounding environment, select an action from a plurality of different actions based on the severity level which was assigned to the operational state of the equipment and based on a prediction as to which component of the equipment is the source of the gas leak, and control operations of an external robotic actuator or electronic device to perform the action;

wherein a prediction is made that (i) a gas tank is the source of the gas leak when the concentration level of flammable gas increases to a first level and remains at the first level for a given duration and (ii) a gas line is the source of the gas link when the concentration level of flammable gas increases to a different second level and remains at the second level for the given duration.

11. The sensor device according to claim 10, wherein the processor is further configured to:

detect a presence of a gas leak from the equipment when a resistance change is received at the electronic circuit from the conductive sensing material, or detect an absence of the gas leak when no resistance change is received at the electronic circuit.

12. The sensor device according to claim 10, wherein the plurality of different actions comprise opening a window, opening a vent, enabling a ventilation system of a building, actuating a switch to disconnect power from all electrical components of the equipment, controlling a building alert system to cause an evacuation of a building, and notifying a remote monitoring or emergency response station.

13. The sensor device according to claim 10, wherein the severity level is assigned by comparing a concentration level of the flammable gas in a surrounding environment to one or more threshold values of the plurality of threshold concentration levels of flammable gas and selecting the severity level from the plurality of severity levels based on said comparing.

14. The sensor device according to claim 13, wherein the plurality of severity levels comprise an urgent severity level, a serious severity level and a less serious severity level.

15. The sensor device according to claim 13, wherein the one or more threshold values comprise an explosion threshold for the flammable gas.

16. The sensor device according to claim 10, wherein the processor is further configured to perform self-check operations to: measure the resistance of the conductive sensing material without a presence of the flammable gas; comparing a value of the resistance to a self-check threshold value; and making a decision as to whether a sensor device is operating properly or improperly based on results from comparing the value of the resistance to the self-check threshold value.

17. The sensor device according to claim 10, wherein the equipment comprises a home appliance, a vending machine, or an HVAC system.

18. The sensor device according to claim 10, wherein the sensor system is an accessory of the equipment or added to the equipment as a plug and play component.

19. The sensor device according to claim 10, wherein resistance is changed due to absorption of the ionization products of the flammable gas by the conductive sensing material.

* * * * *